Oct. 20, 1970          P. E. APPLEBY          3,534,953
APPARATUS FOR FOLDING STRIP MATERIAL
Filed April 17, 1967                    6 Sheets-Sheet 1

INVENTOR.
PAUL E. APPLEBY
BY
AGENT

Oct. 20, 1970     P. E. APPLEBY     3,534,953
APPARATUS FOR FOLDING STRIP MATERIAL
Filed April 17, 1967     6 Sheets-Sheet 5

INVENTOR.
PAUL E. APPLEBY
BY

*R. W. Washburn*
AGENT

Oct. 20, 1970 P. E. APPLEBY 3,534,953
APPARATUS FOR FOLDING STRIP MATERIAL
Filed April 17 1967 6 Sheets-Sheet 6

INVENTOR.
PAUL E. APPLEBY
BY
AGENT

United States Patent Office 3,534,953
Patented Oct. 20, 1970

1

3,534,953
APPARATUS FOR FOLDING STRIP MATERIAL
Paul E. Appleby, Cuyahoga Falls, Ohio, assignor to The Goodyear Tire & Rubber Company, Akron, Ohio, a corporation of Ohio
Filed Apr. 17, 1967, Ser. No. 631,520
Int. Cl. B65h 45/22
U.S. Cl. 270—86     6 Claims

ABSTRACT OF THE DISCLOSURE

A method and apparatus are disclosed for folding a tire cord fabric matreial. The apparatus includes a pair of travelling carrier surfaces or belts movable toward each other about a fold line, making opposite quarter turns toward each other in allochiral spans from a pair of coaxial pulleys to a pair of pulleys each mounted parallel to a central plane which is perpendicular to the axis of the first pair. A strip of tire cord material is advanced, supported by the two belts and folded longitudinally therebetween as the surfaces of the belts turn toward one another.

---

The present invention relates to processing tire cord fabric and particularly to a method and apparatus for folding a strip of tire cord fabric material at a fold line extending in the direction of the length of the strip.

Tire cord fabric is generally formed of cords of suitably high strength as longitudinal or warp members across which are woven pick threads of strength only sufficient to hold the cords in a web for processing. The fabric web is coated with unvulcanized rubber, usually by calendering. So treated, the tire cord fabric is then cut transversely at predetermined angularity with respect to the longitudinal cords. The resulting cut lengths are turned and successively joined one to another so that the warp cords extend transversely at the predetermined angle while the cut edges from the lateral edges of an indefinite length of tire cord material, called bias cut tire cord fabric.

In the construction of certain tires, it is desired that the bias cut tire cord fabric be folded, particularly when the fabric is destined to become a circumferential reinforcing member such as a belt or breaker strip. Heretofore, in providing a folded belt the bias cut fabric has been cut to a length corresponding to the desired circumference of the tire carcass and has been folded manually by placing the cut length upon a table where a portion at one side of the intended fold line is lifted from the table, up and over the fold line, and laid onto the remaining portion so as to form the folded belt. Because of the tacky surface, such methods are awkward, difficult and time consuming.

An object of the present invention is the provision of a method for making a fold in a strip of material such as bias cut tire cord fabric which avoids the disadvantages and difficulties of the manual method described. A further object of the present invention is the provision of apparatus for carrying out the method continuously and economically.

Other and more specific objects and advantages of this invention will become more readily apparent from the following detailed description taken in conjunction with the accompanying drawings which illustrate a form of apparatus useful in connection with the present invention.

2

Figure 1:
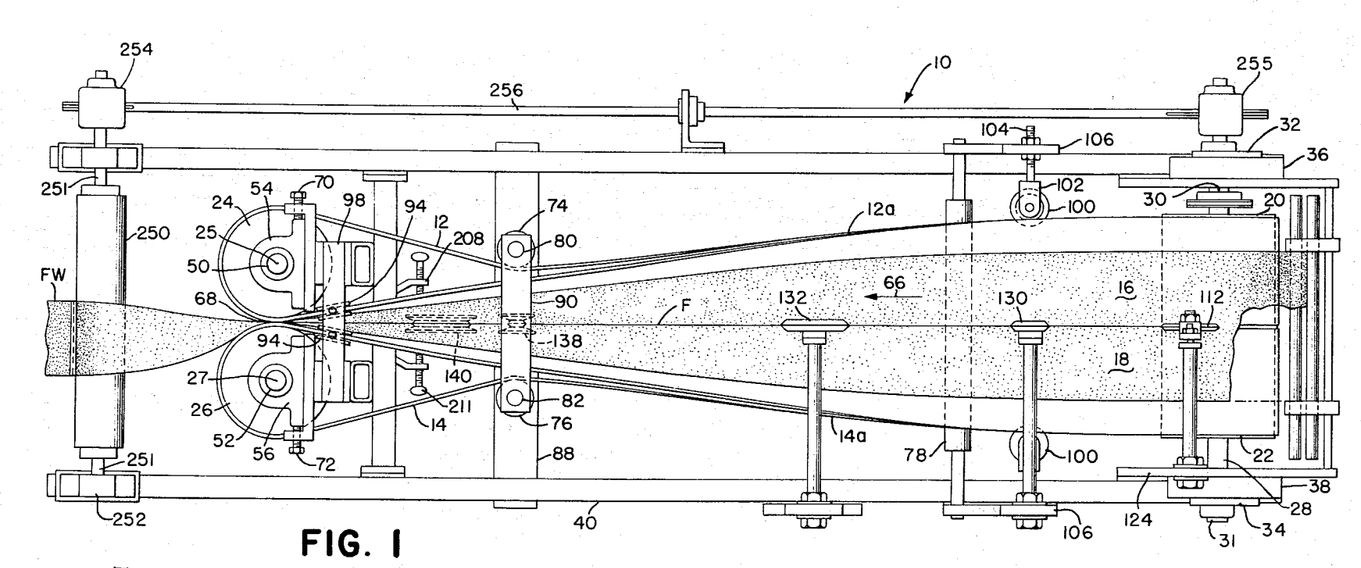
FIGS. 1 and 2 are, respectively, plan and side elevation views of apparatus embodying the instant invention.
Figure 2:
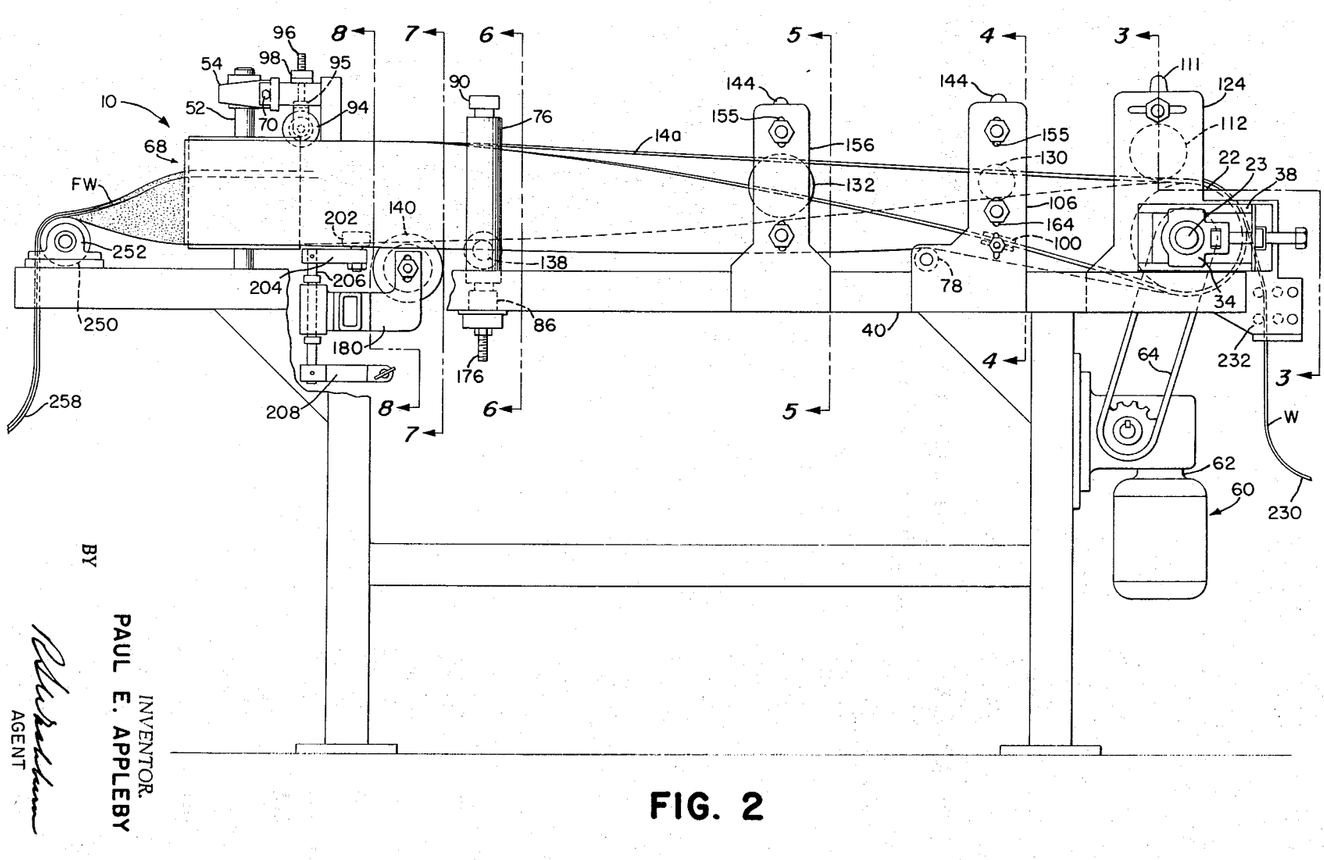

In FIGS. 1 and 2 there is shown a belt folding apparatus 10 embodying certain aspects of the invention. To support or carry the strip to be folded, the apparatus 10 includes strip supporting or carrier means in the form of a pair of belt means 12 and 14 having strip supporting or carrying surfaces 16, 18, respectively. In the present embodiment each belt means 12, 14 is a flat endless belt, the strip supporting surfaces 16, 18 of which extend between guide means in the form of a first pair of pulley means 20 and 22, near the righthand end as shown in FIG. 1, and a second pair of pulley means 24 and 26 near the left.

As will be apparent in FIG. 1, the strip supporting surfaces 16 and 18 are disposed symmetrically, or at least allochirally, with respect to a central plane extending vertically in the present embodiment and represented by the line F, which is the fold line on which the strip material is folded. In the description which follows, reference to the fold line F and to the central plane will make for clearer understanding of the disclosure.

The first pair of pulley means, pulleys 20 and 22, are coaxial and rotatable about an axis of rotation 23 normal or perpendicular to the central plane F of the folding apparatus 10 and are mounted on a common shaft 28, the journals 30, 31 of which are rotatably carried in bearings 32 and 34, which are received in conventional belt take-up slides 36 and 38 supported by the main frame 40. The two pulleys 20 and 22 are of equal diameter and are crowned according to conventional practice for belt pulleys.

The second pair of pulleys means, pulleys 24 and 26, are rotatable about axes of rotation 25, 27, respectively, parallel to the central plane F, thus being at right angles with respect to the other guide means, i.e., the first pair of pulley means 20 and 22. The pulleys 24 and 26 are mounted upon shafts 50 and 52, respectively, each of which is rotatably carried in a pair of conventional pillow-block bearings 54 and 56, which are supported from the frame 40.

As may be seen in the drawings (particularly FIGS. 1 and 2), the strip supporting means 12 and 14 and the strip carrier surfaces 16 and 18 thereof turn or rotate about the line F from a generally coplanar relation adjacent the first pair of pulley means 20 and 22 to a parallel, confronting, or face-to-face juxtaposition adjacent the second pair of pulley means 24 and 26.

To fold the strip of material, relative movement between the belt surfaces 16 and 18 and the guide means 20, 22, 24 and 26 is provided in the present embodiment by a drive means 60 comprising a gear motor 62 connected by a chain and sprocket drive 64 to rotate the pulleys 20 and 22 and drive the belt means 12 and 14. The supporting surfaces 16 and 18 are caused to move in the direction of the arrow 66 along a pair of paths disposed allochirally with respect to the central plane F. Successive portions of the paths travelled by the said surfaces define included angles with the central plane F of from 90 degrees in the portions adjacent the first pulley means 20 and 22, and progressively smaller included angles at successive portions of said paths the surfaces 16, 18, adjacent the second pulley means 24, 26, are in parallel confronting relation, where the portions of the paths travelled by the surfaces 16, 18 define included angles with the central plane F of zero degrees. The belt 12 makes a quarter turn (90 degrees) counter-clockwise (as viewed in the direction of movement) about the fold line F as it traverses the path from the pulley 20 to the pulley 24, while the belt 14 makes a quarter turn clockwise about the fold line F as it traverses its path from the pulley 22 to the pulley 26. Each belt turns toward the other and toward the central plane F progressively from a coplanar to a confronting relation.

It is desirable in folding strip material such as bias cut tire fabric to press the two parts of the material firmly together in order to exclude or express air from between the layers of the folded material and stitch, tack, or adhere them firmly together. One of the particular advantages of the invention and of the apparatus 10 is the provision of nip means to accomplish the immediate pressing of the folded strip. As the strip supporting surfaces 16 and 18 are brought into confronting relation adjacent the guide means, or pulleys 24 and 26, strip material carried by the surfaces 16, 18 is firmly pressed in the nip 68 formed by the closely spaced confronting surfaces of the pulleys 24 and 26 and of the belts 12 and 14 wrapped thereover. The nip 68 so formed contains the central plane and the fold line F. The pulleys 24 and 26 are provided with means for adjustment generally normal to the central plane F by the jack screws 70 and 72 so that the pressure acting upon strip material in the nip 68 can be adjusted. It will be apparent that this adjustment can as well be provided by elastic loading means such as springs, or fluid pressure actuated devices.

It will now be evident that there are numerous alternatives for the belts 12 and 14 and for the pulleys 20, 22, 24 and 26. For example, diverse arrangements of flexible supports or of single or multiple flat or V-belts, or the like, which will provide suitable flexible supporting or carrying surfaces movable in the manner set forth may be employed. Means adapted for returning the carrier means in an endless loop, or plural loops, again to traverse the paths described will, of course, be adapted to suit the particular belt means chosen. The terms "support means" and "carrier means" as used herein are intended to include all such alternative means.

In the present embodiment the belts 12 and 14 are wrapped about their respective pulleys 24 and 26, in returning pass between a pair of directing idler rolls 74 and 76 and over a single directing idler roll 78 to complete the endless or closed loop of each belt over the pulleys 20 and 22, respectively. The return rolls 74 and 76 are rotatably mounted upon shafts 80 and 82 which are secured in the bosses 84 and 86 carried by the frame cross-member 88. The tie member 90 secures the upper ends of the shafts 80, 82 with respect to one another.

The outer edges 12a and 14a of the belts 12 and 14 are restrained from outward lateral movement, i.e., movement laterally away from the line F, by a pair of edge guide wheels 94 which engage the said outer edges of the belts 12 and 14 as the latter approach the nip 68. The guide wheels 94 are mounted for adjustment toward and away from the belt edges in a pair of yokes 95 having threaded shanks 96 carried by the cross-member 98. A similar pair of edge guide wheels 100 engage the outer edges 12a and 14a, respectively, of the belts 12 and 14 as they approach the pulleys 20 and 22. The wheels 100 are mounted rotatably in the yokes 102 each having a threaded stem 104 suitably attached to the brackets 106 carried by the frame 40, as may also be seen in FIG. 4.

Figure 3:
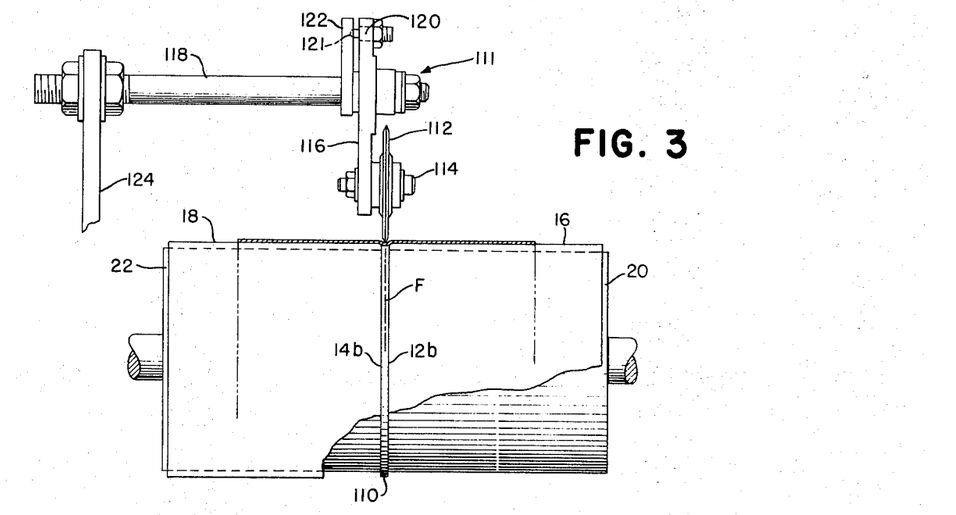
FIGS. 3, 4, 5, 6, 7 and 8 are successive cross-sections taken generally as indicated by the lines 3—3, 4—4, 5—5, 6—6, 7—7 and 8—8, respectively in FIG. 2.

Referring now to FIG. 3, the pulleys 20 and 22 are spaced axially with respect to one another by a small annular ridge or ring 110 which, together with the previously mentioned crown on the faces of each of the pulleys 20 and 22, serves to guide and space the belts 12 and 14 a slight distance from one another and from the central plane F. In the embodiment shown, the pulleys 20 and 22 are formed on a single member such that the annular ring or ridge 110 extends radially outward from the pulley faces a distance slightly less than the thickness of the belts 12 and 14.

Above the belts 12 and 14, poised over their adjacent edges 12b and 14b, an edge guide assembly 111 comprises a small rotatable guide wheel 112 which serves to mark the fold line and may serve to initiate the fold in the strip material, the periphery of the wheel being in the form of a double coned surface. The wheel 112 is rotatably mounted about a stud shaft 114 which is carried by a plate 116 which is pivotally mounted on a cantilevered pin 118. The plate 116 incorporates an adjustable spring loaded detent 120 which is normally engaged in a seat 121 in a fixed arm 122 extending radially outward from the pin 118. The assembly 111 is mounted for lateral and longitudinal adjustment with respect to the belt paths from a suitable bracket 124 affixed to the frame 40. The detent arrangement 120, 121 permits the plate 116 and the wheel 112 to swing away from its normal proximity to the surfaces 16, 18 of the belts as desired, or in the event of accidental overloading.

The inner edges 12b and 14b, respectively, of the belts 12 and 14 travel in close proximity to the fold line F being constrained so to travel by a series of edge guide means, shown in FIGS. 4, 5, 6, 7 and 8, comprising the upper double-coned rollers 130 and 132, and opposed cooperating lower double-coned rollers 134 and 136. The rollers 130 and 132 are formed with double-coned peripheries, having, in cross-section, a V-shape, the slant sides of which conform to the angles of the surfaces 16, 18 of the belts at the portions of their paths where the roller is situated.

The lower double coned edge guide rollers 134 and 136 which cooperate with the upper rollers 130 and 132 as well as the edge guide rollers 138 and 140 are also formed with twin opposed coned surfaces, the slant angles of which cones are supplementary to the included angles defined by the portions of the belt path at their respective locations so that the cone surfaces conform to the slope of the belt surfaces 16, 18.

Each of the upper edge guide rollers 130 and 132 forms a part of an edge guide assembly 144 similar to the previously described assembly 111, and each of which comprises a yoke 146 in which the rollers 130 and 132, respectively, are rotatably carried, and which yokes 146 are pivotally supported from cantilevered pins 148. Each of the yokes 146 incorporates an adjustable spring loaded detent 150 which are normally engaged in the seats 151 in fixed arms 152 extending radially outward from the pins 148. The pins 148 are each provided with threaded portions 154 which are received in slots 155 in the brackets 156 and 106, respectively, and are three secured by clamp nuts 158 so that the assemblies 144 are vertically and horizontally (as shown in FIGS. 4 and 5) adjustable to locate the edge guide wheels 130 and 132 centrally with respect to and for rotation in the central plane F.

The cooperating pairs of guide rollers 130, 134 and 132, 136 are spaced apart slightly more than the thickness of the belt means 12 and 14 and web W thereon passing therebetween and serve to prevent weaving, fluttering, or oscillations, but do not ordinarily contact or press against the strip material carried by the belts.

Figure 4:
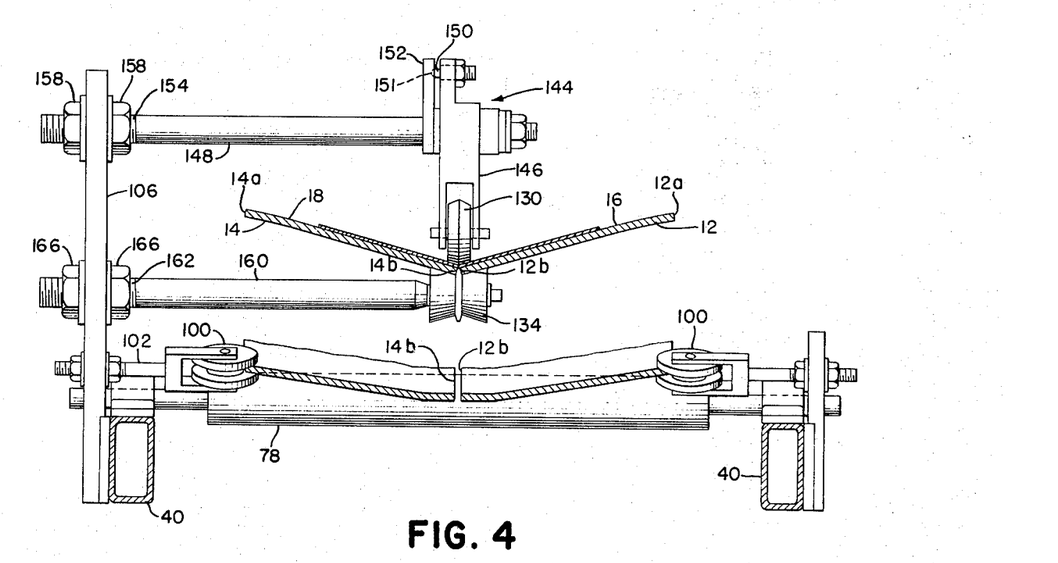
Figure 5:
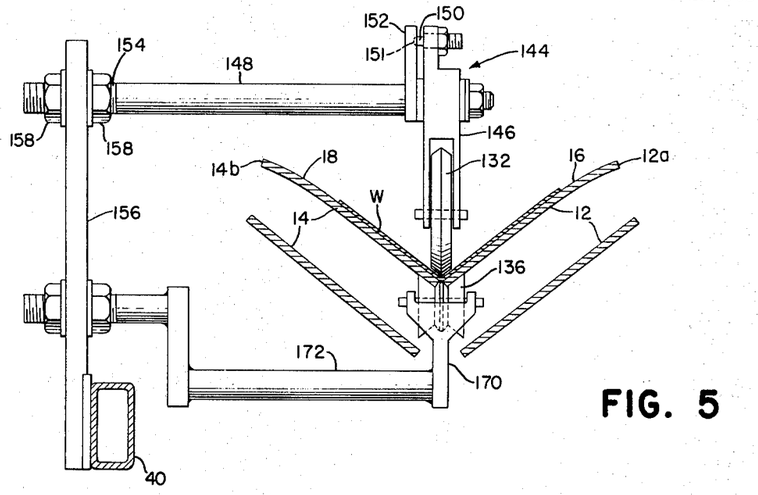
Figure 6:
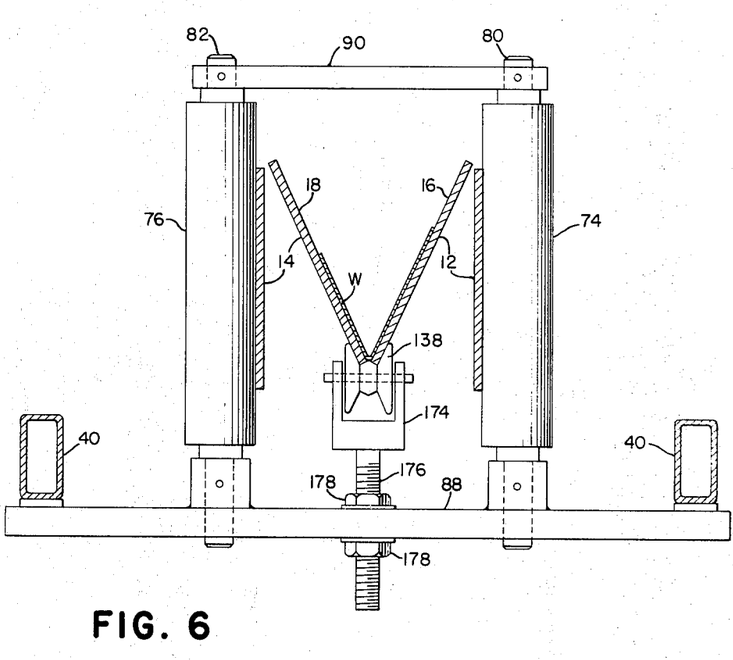
Figure 7:
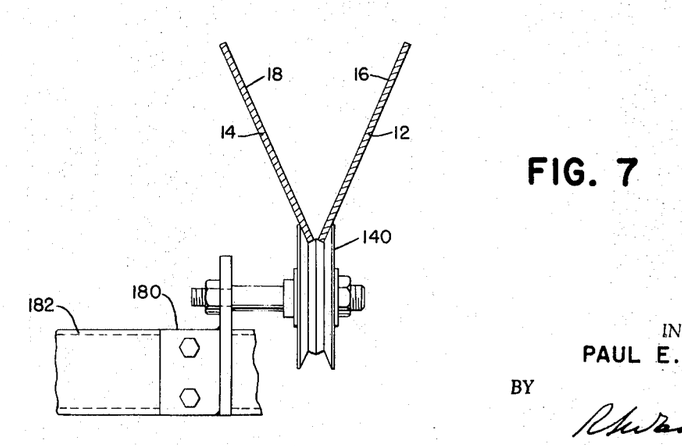

The lower roller 134 is rotatably affixed to a cantilevered pin 160 having a threaded portion 162 which is received in a slot 164 in the bracket 106 and adjustably fixed therein by the clamp nuts 166 so that the roller 134 can be vertically and horizontally (as shown in FIG. 4) adjusted to position the roller 134 with respect to the central plane F and the belt edges 12b and 14b. The edge guide roller 136 is rotatably carried in a yoke 170 affixed to an offset cantilevered pin 172 which is adjustably secured to the bracket 156, in the manner described in connection with the pin 160 and the bracket 106. The edge guide roller 138 is supported for rotation in a yoke 174 disposed between the rolls 74, 76 and having a threaded stem 176 which is secured to the cross-member 88 by clamping nuts 178. The lower roller 140 is carried rotatably by a bracket 180 which is secured to a frame cross-member 182. The number and arrangement of edge guide rollers is, of course, determined by the character of the belt means and by the distance travelled by the belt means from the first pair to the second pair of pulleys.

Figure 8:
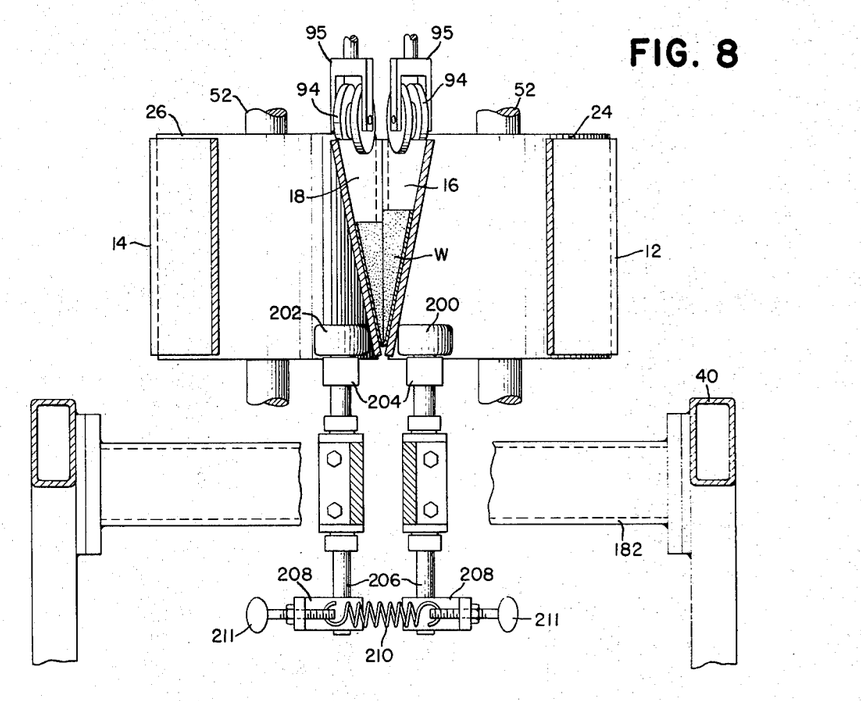

Making reference now particularly to FIGS. 2 and 8, a small auxiliary nip is formed between the rollers 200 and 202, which are shown in a spread or open position. The rollers 200, 202 are mounted upon a pair of swing arms 204 carried by a pair of rock shafts 206 mounted swingably on frame cross-member 182. A pair of lever arms 208 each attached to a rock shaft 206 are urged toward one another by a spring 210, the tension of which can be varied by wing screws 211, so as to close the auxiliary nip between rollers 200 and 202.

Figure 9:
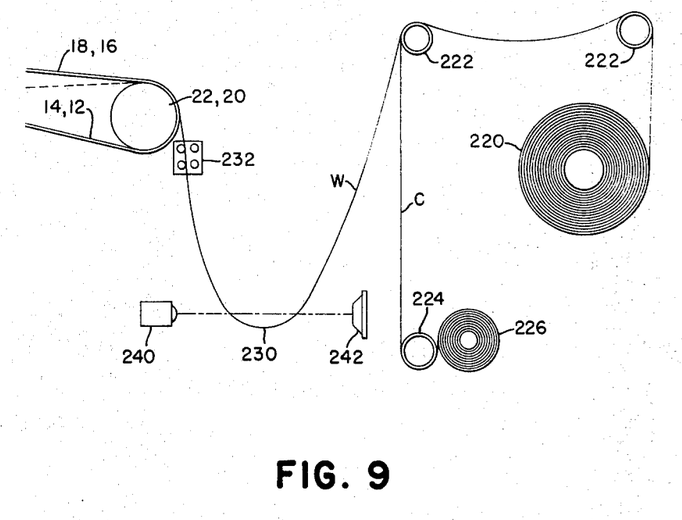
FIGS. 9 and 10 are schematic elevations of fabric material supply and take-up means, respectively, used with the apparatus of FIGS. 1 and 2.

Making reference now to FIGS. 1 and 9, a supply roll 220 having wound thereon an indefinite length of bias cut tire cord fabric together with an interleaved supporting strip of cloth, or film, C, the roll 220 being mounted for rotation on means not shown. The supporting cloth C with the bias fabric web W thereon passes over a pair of supports 222, the cloth C being drawn from the roll 220 by winding means 224 which drives a spool 226, to rewind the cloth alone thereon. The bias cut fabric W, separated from the cloth C, is draped from the guide means 222 in a loop, or festoon 230 and passed through a side or centering guide 232 to the first pulley means 20 and 22, previously described. The feston 230 is used to control the relative forward movement of the fabric web W into the folding apparatus 10 and from the roll 220. A photocell unit 240 throws a light beam toward a reflector 242. The interruption of the beam by the presence of the festoon 230 produces a signal from the photocell 240 which is used to slow, or stop, the advance of the web W from the supply means; the completion of the light circuit from the photocell 240 to the reflector 242 and return provides a signal which is used to start, or to speed up, the delivery of the web W from the supply roll 220.

Figure 10:
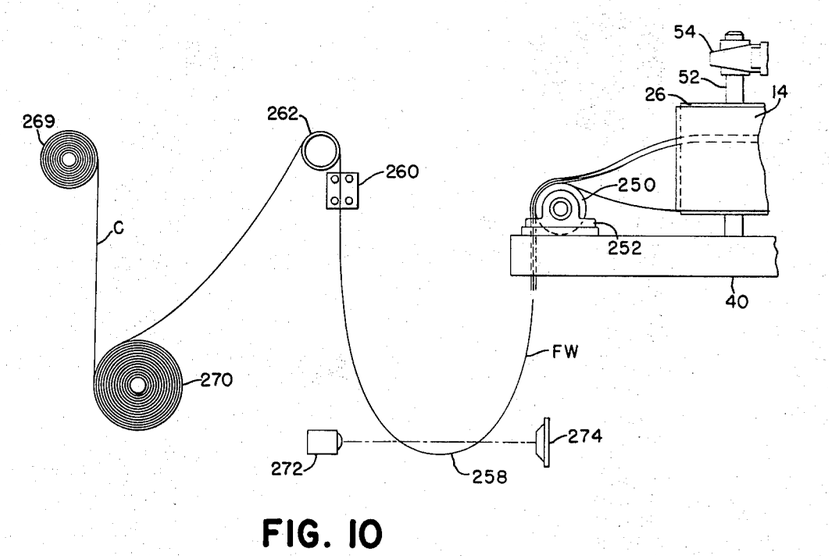

Referring now to FIGS. 1 and 10, to receive the folded bias cut fabric from the nip 68, a delivery roll 250, the journals 251 which are rotatably mounted in a pair of conventional pillow blocks 252 carried by the frame 40, is drivingly connected to the shaft 28 to rotate at a surface speed equal to the surface speed of the carrying surfaces 14 and 16 by means of the bevel gear sets 254, 255 and the intermediate shaft 256. From the delivery roll 250 the folded web FW is draped in a festoon 258, through side guide or centering device 260, and over take-up guide bar or roll 262 to be wound (together with cloth, or film, interleaving strip C, from a supply roll 269) upon a take-up spool 270. Suitable control of the take-up spool speed is provided by a photocell device 272 which, as in the manner previously described, casts a beam of light toward a reflector 274. As the festoon 258 increases in length to interrupt the light beam from the photocell 272 the signal generated is employed to energize the drive means, not shown, to start, or increase, the winding speed of the spool 270. As the festoon 258 decreases in length, permitting the light beam from the photocell unit 272 to strike the reflector 274 and return, a second signal is provided which operates to slow, or stop, the winding of the spool 270.

Turning again to FIGS. 4 and 5, it will be noted that the laterally outward edges 12a and 14a are curved slightly downward with respect to the portions intermediate the edges of the surfaces 16 and 18, respectively, of the belts. Due to the crossed axis relation of the pulleys 20 and 22 with the pulleys 24 and 26 and lateral edges 12a and 14a of the two belts are slightly elongated with respect to the centerline length of each belt 12 and 14. This has the effect of causing the slight curvature shown in FIGS. 4 and 5 and results in an advantage of the embodiment herein shown in that the belts 12 and 14 bring the material being folded into face-to-face contact progressively outwardly starting from the fold line, and from the adjacent inner edges 12b and 14b of the belts, toward the laterally outward edges of the strip material and of the belts. This reduces the possibility of air being trapped between the layers of the strip being folded as they are brought together. It is desirable that the surfaces of carrier means be arranged so that the contact between the portions occurs progressively outward from the fold line as well as along successive increments of the length of the strip of the material.

The invention moreover contemplates a novel method of making a continuous fold in an indefinite length of strip material such as bias cut tire cord fabric. The method comprises advancing the strip of material along a path which includes the line of the intended fold while at the same time supporting the strip without the application of lateral or longitudinal tensions, and positioning predetermined portions of the strip on either side of the fold line and progressively turning successive increments of length of the portions of the strip upwardly about the fold line from the plane of the unfolded material so that the portions at each side of the fold line approach and come into contact with each other progressively outwardly from the fold line and progressively along the length of the strip.

Freedom from the applied lateral or longitudinal tensions avoids distortion, or disarrangement, of the warp cords. Distortion, disarrangement, of the cords which compose the belt member can result in non-uniformity in the structure and performance of the tire in which the belt member will be used. It is also desirable to avoid entrapment of air between the layers of folded material constituting the belt. The method avoids the entrapment of air by progressively bringing the layers of belt material into contact outwardly from the fold line and along the length of the strip.

In carrying out the invention, the operation begins by providing a supply of bias cut tire cord fabric typically in the form of an interleaved roll 220. The material is led over the guides 222, the interleaving protective material being removed as the tire cord fabric advances into the apparatus 10. The leading end of the web W is drawn from the roll 220 to form a short loop, or festoon, 230, is threaded through the centering guide means 232 and positioned so that the required line of fold coincides with the central plane and the fold line F and under the guide and marking wheel 112 of the apparatus, and is adhered lightly to the surfaces 16, 18 of the belts 12 and 14. The drive 60 is started causing the belts to advance carrying on their surfaces the parts of the length of strip at either side of the fold line F. As the belts advance from adjacent the pulleys 20, 22, their surfaces 16, 18 tend to converge angularly, turning or rotating about the fold line F. Continued forward movement of the belts brings the surfaces 16, 18 and the two parts of material thereon from the common plane, the original plane of the fabric, into face-to-face juxtaposition as the advancing belts and the material thereon pass through the nip 68. Emerging from the nip 68 in its now folded state, the web FW passes over the delivery roll 250, from which it is draped to form a second loop, or festoon, 258, to the support or roll 262. The now folded strip material FW is wound onto the take-up roll 270 together with interleaving material C from a supply roll 269, the lateral position of the belt FW being controlled by the guide means 260.

Figure 11:
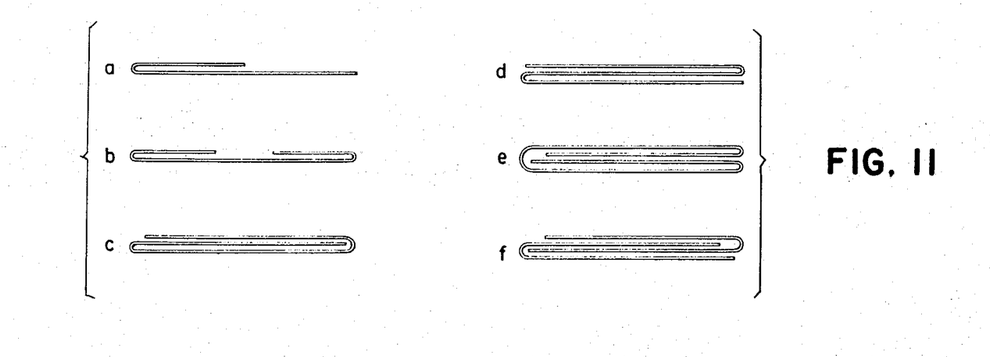
FIG. 11 is a series of representative cross-sectional configurations of folded strip material.

The invention also contemplates producing in the folded strip, a second fold parallel to the first fold so that, for example, each edge or side portion of a continuous strip can be folded inward to lie on an intermediate portion of the width of the strip, or so that one edge or side portion overlaps the other and both overlie the intermediate portion, as are depicted in FIGS. 11b and c, respectively. FIG. 11 also presents representative fold arrangements, d through f, which, as well as others not shown, may be similarly and easily formed in accordance with the method and the apparatus of the invention. To produce a second or subsequent fold in a given strip, the folded strip is either again put through the apparatus 10, or conveyed to and through a second or subsequent generally identical apparatus. Furthermore, a plurality of strips can be interfolded, as shown in FIG. 11*f*.

It will be appreciated that the belt, or web, to be folded is supported by and in contact with a flexible supporting means, which in the specific embodiment is provided by the supporting members in the form of flat belts 12 and 14 which move relative to the guide means as described. Among several alternative forms which the apparatus may take, it is evident that driving means can be provided to move the guide means while holding flexible supporting members longitudinally fixed so their web supporting surfaces are progressively turned about the fold line to bring the tire cord fabric at either side of the fold line into face-to-face contact.

As has been mentioned, the web supporting surfaces may be provided in various ways, for example, the two carrying surfaces which are provided by the flat belts of the specific embodiment herein described can each be provided by a series of shorter belts or the like on each side of the fold line, or a plurality of similar length but lesser width belts on each side of the fold line.

A characteristic of the carrying surface, in addition to its flexibility, is that it supports the belt material to be folded so that the material does not undergo tension or deformation. It will be apparent that the material moves with the carrying surfaces both as they advance longitudinally and as they are progressively turned from the flat or coplanar relation to the confronting relation and are then stitched, or adhered, together to form the folded web. The belts, of course, are arranged to move at equal longitudinal speeds and are constrained to move, by suitable edge guiding means, precisely along the prescribed paths, thus insuring that undesirable deformations in the cord fabric do not take place. In the present embodiment and with web materials processed, the slight tension provided by the festoon 230 provides sufficient adherence of the web to the belt surfaces, so that the web is conveyed substantially without lateral or longitudinal slip with respect to the carrying surfaces. With certain materials, it may become advantageous to provide a stitching roller (not shown) parallel and adjacent to the pulleys 20 and 22 and forming nips therewith so as to adhere the material to the belt surfaces. The apparatus 10, although shown and described in generally horizontal orientation, may be employed in a vertical position, or in other attitudes suited to the particular production line sequence in which it may be used. In alternative cases the said stitching roller may become more desirab The driving means described may be operated at any constant speed suited to the operation and to the requirements of the production line. It may as well be provided with a variable speed control responsive to the speed of other associated equipment.

The guide means in the form of the pulley means 20, 22, 24 and 26 are, in the embodiment herein described, the end pulleys of a pair of endless looped belts. The pulleys function as guide means for the belt means. The former pair, pulleys 20 and 22, serve to drive the belt means and the latter pair, pulleys 24 and 26, serve also to provide the nip 68. It will be appreciated as being within the scope of the invention, however, that the belt means may take any course whatsoever in its or their return reach from the guide means 24 and 26 to the guide means 20 and 22 and may be driven by any conventional driving means engaging the belt means to advance it, or them, along the described pair of paths.

Certain tire cord fabric materials are sufficient in gage thickness to resist folding due to their transverse stiffness. The auxiliary nip rollers 200 and 202 are particularly adapted to close and to stitch together the layers of material at and close to the fold line to overcome the transverse stiffness of the material and to insure that, even though the parts of the material at either side of the fold line are securely stitched together, there will be no air trapped along the line of fold. This auxiliary nip, in the specific embodiment, engages the flat belts to press together the two layers of material at the fold line. It will be evident, however, that the auxiliary nip may be located to engage the carrier means with the material therebetween, or may engage the folded edge of the material directly, after the material has separated from the carrier means so long as it precedes the main nip in which the material is pressed.

Moreover, it is contemplated within the scope of the invention that nip means, preferably a pair of rotatable parallel rolls, may be provided separately from the guide means and that such nip means may engage the belt or carrier means with the strip therebetween in advance of the guide means 24, 26; or may receive the folded web therebetween following the guide means and subsequent to the separation of the folded web from the carrier means.

The carrier means in the specific embodiment shown wrap the pulleys through angles of about 180 degrees. It will be apparent that this degree of wrap is determined by the manner in which the return reach of the carrier means is conducted from the pulley 24 to the pulley 20, or from the pulley 26 to the pulley 22. As previously mentioned the manner in which the carrier means are returned is not significant, and the amount or degree of wrap over the guide means may be materially changed without affecting the operation of the folding apparatus.

In the foregoing specification the term "wrap" will be understood to mean, with respect to either belt means or web material, any engagement of belt or material with a guide, pulley, roller, or the like, which changes the direction of movement of the belt or material through any angle, however small, from the direction in which the material approaches into contact with the guide, pulley, or roller to a new direction in its departure from such guide, pulley, or roller.

While certain representative embodiments and details have been shown for the purpose of illustrating the invention, it will be apparent to those skilled in this art that various changes and modifications may be made therein without departing from the spirit or scope of the invention.

What is claimed is:

1. Apparatus for folding a continuous running length of tire cord fabric or the like to produce a continuous running strip of lesser width comprising carrier means having a pair of adjacent and laterally separable elongated surfaces adapted to engage said length and dispose one at each side of a fold line, means for moving said surfaces in one direction longitudinally or themselves while turning each of said surfaces about said fold line from a first angular relation to a lesser angular relation with respect to the other of said surfaces, a pressing nip operative to press the folded strip therein, auxiliary nip means spaced from said pressing nip in a direction opposite the direction of longitudinal movement of said surfaces and operative to act upon said fabric being folded at and adjacent to said fold line, and means for separating said surfaces after displacing said surfaces a predetermined angular amount about said fold line.

2. Apparatus for folding a strip of material comprising endless looped belt means including a pair of endless looped belts providing a pair of material supporting surfaces respectively movable along a pair of paths disposed allochirally with respect to a central plane containing a fold line along which the material is to be folded, said paths extending generally in the direction of said fold line, first guide means comprising a pair of pulley means disposed at opposite sides of the fold line and respectively engaging said belts and cooperating with a portion of said belt means to provide a first included angle between said surfaces, second guide means spaced from said first guide means in the direction of movement of said surfaces and comprising a second pair of pulley means disposed on opposite sides of the fold line and respectively engaging said belts to provide a second included angle between said surfaces, said second included angle being less than said first included angle, and including a directing roll mounted for rotation about an axis substantially parallel to the axis of one of said second pair of pulley means, said roll being wrapped by a return reach of said belt means extending from said one of said second pair to the associated one of said first pair of pulley means, said roll being located such that a plane perpendicular to the axis of the said associated one of said first pair at the centerline of the portion of said belt means wrapping said associated one pulley means is substantially tangent to said roll at that part of the surface thereof wrapped by said return reach.

3. Apparatus according to claim 2 comprising a second directing roller mounted for rotation about an axis substantially parallel to, the second said axis, said roller being wrapped by said return reach intermediate the first mentioned directing roll and said axis, and a belt guide member associated with said roller for restraining edgewise movement of said belt means.

4. Apparatus for folding a strip of material comprising endless looped belt means including a pair of endless looped belts providing a pair of material supporting surfaces respectively movable along a pair of paths disposed allochirally with respect to a central plane containing a fold line along which the material is to be folded, said paths extending generally in the direction of said fold line, first guide means comprising a pair of pulley means disposed at opposite sides of the fold line and respectively engaging said belts and cooperating with a portion of said belt means to provide a first included angle between said surfaces, second guide means spaced from said first guide means in the direction of movement of said surfaces and comprising a second pair of pulley means mounted for rotation about a pair of spaced apart axes generally parallel to said central plane and cooperating to provide a pressing nip for pressing the strip of material, an auxiliary nip means spaced from said pressing nip in the direction opposite the direction of movement of said surfaces and operative to act upon the strip being folded at and adjacent to the fold line, and belt edge guide means associated with said second pulley means disposed between said first and second pulley means and engageable with at least one of said belts to limit edgewise movement of said one with respect to said second pulley means.

5. Apparatus according to claim 4 wherein said edge guide means includes a cooperating pair of double coned rollers each having a pair of generally frusto-conical peripheral surfaces, said pair of rollers being spaced apart in a direction normal to said fold line in said plane and on opposite sides of said belt means a distance greater than the combined thickness of said belt means and the strip to be folded and receiving the adjacent edges of said belt means therebetween, said peripheral surfaces having surface portions respectively parallel to the surfaces of said belt means received therebetween.

6. Apparatus according to claim 4 comprising means operatively connected with said belt means for supplying strip material to be folded onto said belt means adjacent said first guide means, a strip material guide device engageable with the strip material to train the strip material into contact with said belt means in a preselected lateral relation to the fold line, roll means drivingly connected with said belt means to separate and carry folded strip material from said pressing nip, and take-up means for receiving the folded strip material.

References Cited

UNITED STATES PATENTS

| | | | |
|---|---|---|---|
| 247,922 | 10/1881 | Jones | 270—86 |
| 589,083 | 8/1897 | Hart | 270—86 |
| 778,462 | 12/1904 | Sexton | 270—41 |
| 3,127,165 | 3/1964 | St. Denny et al. | 270—86 XR |
| 3,365,192 | 1/1968 | Giletta | 270—86 |

FOREIGN PATENTS

| | | |
|---|---|---|
| 386,372 | 1/1933 | Great Britain. |

BENJAMIN A. BORCHELT, Primary Examiner

S. C. BENTLEY, Assistant Examiner

U.S. Cl. X.R.

156—443

UNITED STATES PATENT OFFICE
CERTIFICATE OF CORRECTION

Patent No. 3,534,953          Dated October 20, 1970

Inventor(s) Paul E. Appleby

It is certified that error appears in the above-identified patent and that said Letters Patent are hereby corrected as shown below:

Col. 1, line 13, "matreial" should read -- material --;

Col. 1, line 39, "from" should read -- form --;

Col. 2, line 65, after "paths" insert -- until --;

Col. 4, line 47, "three" should read -- there --;

Col. 5, line 26, "feston" should read -- festoon --.

Claim 1, line 5, "dispose" should read -- disposed --;

Claim 1, line 7, "or" should read -- of --.

SIGNED AND
SEALED
FEB 9 1971

(SEAL)
Attest:

Edward M. Fletcher, Jr.
Attesting Officer

WILLIAM E. SCHUYLER, JR.
Commissioner of Patents